United States Patent [19]

Yoshida et al.

[11] Patent Number: 4,760,300
[45] Date of Patent: Jul. 26, 1988

[54] SQUIRREL-CAGE TYPE ROTOR AND METHOD FOR ITS MANUFACTURE

[75] Inventors: Akio Yoshida; Kenji Kawaguchi; Enkichi Oura, all of Amagasaki; Takashi Okada; Shuichi Odaka, both of Ojima, all of Japan

[73] Assignee: Mitsubishi Denki Kabushiki Kaisha, Tokyo, Japan

[21] Appl. No.: 34,163

[22] PCT Filed: Jul. 3, 1986

[86] PCT No.: PCT/JP86/00341

§ 371 Date: Mar. 4, 1987

§ 102(e) Date: Mar. 4, 1987

[30] Foreign Application Priority Data

Jul. 5, 1985 [JP] Japan .................. 60-147982
Jul. 9, 1985 [JP] Japan .................. 60-150553

[51] Int. Cl.⁴ .............................................. H02K 3/06
[52] U.S. Cl. ...................................... 310/211; 310/42; 310/261
[58] Field of Search ............... 310/42, 211, 212, 217, 310/261

[56] References Cited

U.S. PATENT DOCUMENTS

| | | | |
|---|---|---|---|
| 3,027,472 | 3/1962 | Rosenberry | 310/261 |
| 3,092,744 | 6/1963 | Stonebrook | 310/211 |
| 3,242,361 | 3/1966 | Varner | 310/211 |
| 3,987,324 | 10/1976 | Linkous | 310/211 |
| 4,158,225 | 6/1979 | Hertz | 310/211 |
| 4,209,722 | 6/1980 | Peachee | 310/211 |
| 4,309,635 | 1/1982 | Sei | 310/211 |

FOREIGN PATENT DOCUMENTS

| | | | |
|---|---|---|---|
| 51-41857 | 10/1976 | Japan . | |
| 0151255 | 9/1982 | Japan | 310/211 UX |
| 58-47555 | 3/1983 | Japan . | |
| 58-86848 | 4/1983 | Japan . | |
| 0207848 | 12/1983 | Japan | 310/211 UX |
| 0189055 | 10/1984 | Japan | 310/211 UX |

Primary Examiner—R. Skudy
Attorney, Agent, or Firm—Oblon, Fisher, Spivak, McClelland & Maier

[57] ABSTRACT

When the slotted conductor 1e and the end rings 1d of the squirrel-cage type rotor core 1 are to be formed, molten aluminum is filled in them at a flow rate of 1.5 m/sec. or below, and then the molten aluminum is solidified under a pressure as high as 400 kg/cm² or above, whereby improved density of aluminum as solidified is attained in a range of from 2.64 to 2.70 g/cm³. On account of this, there can be effectively obtained a squirrel-cage type rotor with improved torque characteristic, quality and operational reliability, thus realizing reduction in size and weight of the motor.

4 Claims, 7 Drawing Sheets

SQUIRREL-CAGE TYPE ROTOR AND METHOD FOR ITS MANUFACTURE

TECHNICAL FIELD

This invention relates to a squirrel-cage type rotor and a method for its manufacture. More particularly, it is concerned with aluminum material for forming a rotor conductor.

BACKGROUND ART

Figure 1A:
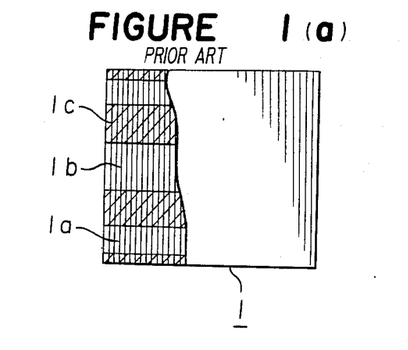
FIG. 1(a) is a front view showing a cross-section with one part thereof being cut away.
Figure 1B:
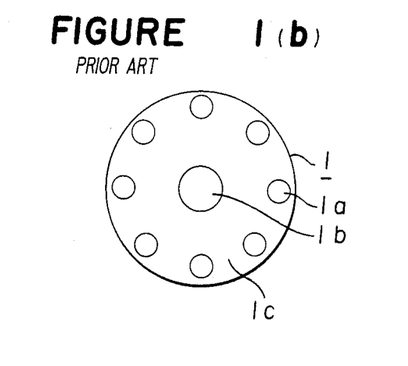
FIG. 1(b) is a side view.

FIGS. 1(a) and 1(b) illustrate a general squirrel-cage type rotor prior to its casting, in which FIG. 1(a) is a front view showing its cross-section with one part thereof being cut away, and FIG. 1(b) is a side elevational view of the rotor. In the Figures, a reference numeral 1 designates a rotor core formed by lamination, a numeral 1a refers to a slot, 1b denotes a bore for inserting the rotational shaft, and 1c represents a circular steel plate.

So far, this rotor has been manufactured by laminating required number of circular steel plates 1c, each having slots 1a and a rotational shaft inserting hole 1b perforated therein, and then forming the laminated body into a rotor conductor by the aluminum die-cast technique, after which the rotational shaft is inserted into the shaft inserting hole to complete the rotor.

Figure 2:
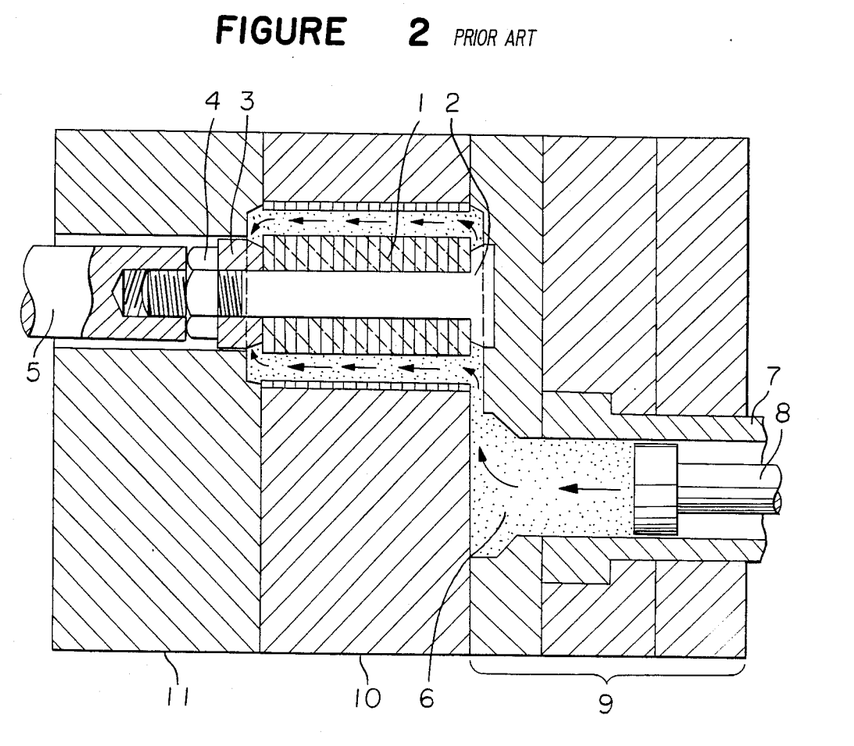
FIG. 2 is a cross-sectional view showing a conventioanl casting device.

FIG. 2 is a cross-sectional view of a casting apparatus for the conventional cage type rotor, in which a reference numeral 2 designates a virtual mandrel; a numeral 3 refers to a collar; and 4 denotes a nut. An iron cores 1 for the rotor are integrally fastened with the nut 4 by means of the virtual mandrel 2 and the collar 3. A reference numeral 5 designates an extruding rod for taking out a shaped article after its formation; a numeral 6 refers to molten aluminum as the metal material for the rotor conductor; a numeral 7 represents a sleeve for injecting the molten aluminum; 8 refers to a plunger for applying a pressure; 9 denotes a fixed metal mold; 10 represents an intermediate metal mold; and 11 refers to movable metal mold.

The die-cast method for the conventional squirrel-cage type rotor is done in the following manner. That is to say, the iron cores 1 for the rotor, which have been put together integrally by means of the virtual mandrel 2, the collar 3 and the nut 4, are inserted into a cylindrical bore of the intermediate metal mold 10, and then the intermediate metal mold 10 and the movable metal mold 11 are pushed to the fixed metal mold 9 to tightly close the entire mold. Thereafter, the molten aluminum 6 injected into the sleeve 7 is compressed by the plunger 8 at a plunger speed of about 1 m/sec. to flow in and through the slots 1a of the rotor core 1 at a flow rate greater than 1.5 m/sec. and is filled in the slots and the end rings at high speed within a time instant shorter than 1 second and rapidly cooled. After this, the metal mold is opened apart between the fixed metal mold 9 and the intermediate metal mold 10, followed by pushing out the rotor core 1 with the extruding rod 5.

Figure 3A:
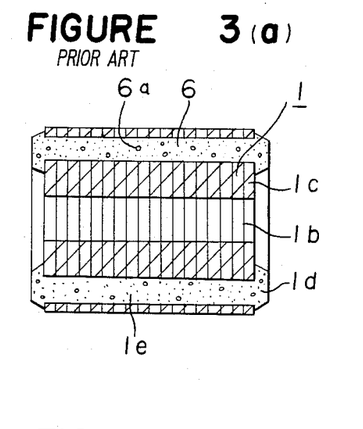
FIG. 3(a) is a cross-sectional view.
Figure 3B:
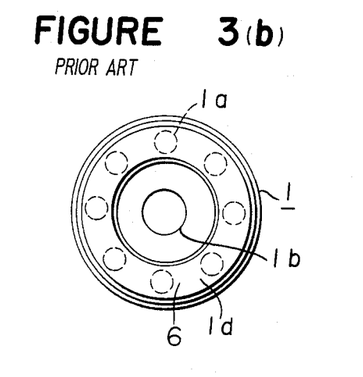
FIG. 3(b) is a side view.

FIGS. 3(a) and 3(b) illustrate the thus manufactured conventional squirrel-cage type rotor, in which FIG. 3(a) is a cross-sectional view, and FIG. 3(b) is a side view thereof. In the Figures, a reference numeral 1d designates an end ring, a numeral 1e refers to a slotted conductor, and 6a represents blowholes. By the way, it is to be noted that the rotor conductor is formed with the end rings 1d and the slotted conductor 1e. Further, FIG. 4 is a micrograph representing the metallographic structure of the rotor conductor (aluminum).

Figure 4:
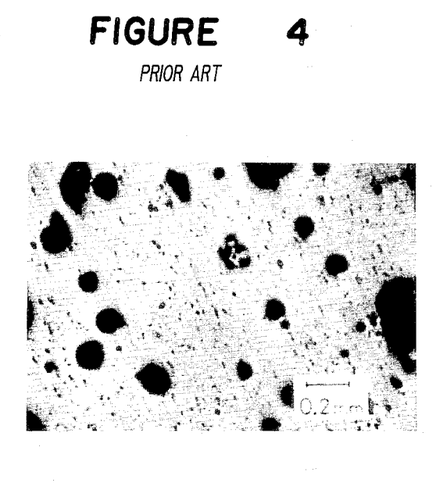
FIG. 4 is a micrograph showing a metallographic structure of conventional rotor conductor.

As is apparent from FIGS. 3(a) and 4, there are produced shrinkage holes in the interior of the slotted conductor 1e and the end rings 1d of the rotor after it is subjected to the die-cast operations, which comes into connection with decrease in density. While pure aluminum, for instance, has a density of 2.7 $g/cm^3$, the density of aluminum of this conventional rotor conductor is 2.57 $g/cm^3$ at best. The lowered density hinders conduction of the secondary current induced in the rotor, which, furthermore, reduces the rotational torque of the rotor.

At present, therefore, the designing of the rotor is done in such a manner that a safety factor is taken in consideration of decrease in the electric conduction caused by the reduction in density (shrinkage holes), but no thought is given for the full display of the property of the material for the rotor conductor.

In order therefore to obtain the desired motor characteristics, various measures are taken such that thickness of the rotor is increased, the winding for the stator at the primary side is made thicker, and so on. As the consequence of these measures, the motor itself becomes large in size, which not only hinders reduction in its size and weight but also necessitates excess amount of materials, thereby pushing up the production cost of the motor. Further, the blowholes created within the body of the slotted conductor causes decrease in the mechanical strength of the rotor, which are liable to bring the motor into possible risk of wire-breakage and damage during the high speed rotation of the motor.

As mentioned above, with the conventional squirrel-cage type rotor, there have been many points of problem such that the shrinkage holes occur in the interior of the slots and the end rings of the rotor conductor, which bring about decrease in density of the rotor conductor, without being able to attain the high density in the rotor conductor, thereby causing hinderance against increase in the rotational torque of the rotor. Moveover, no limit design is made for the rotor to permit it to display its material characteristics to the fullest extent, which hinders reduction in size and weight and also causes the mechanical strength of the rotor to reduce, which might bring about possible risk of the wire-breakage and damage at the time of high speed rotation.

SUMMARY OF INVENTION

The present invention is to provide a squirrel-cage type rotor provided with a rotor core formed by laminating circular steel plates, and having slots which pierce through the core in the direction of its lamination; a slotted conductor filled in the slots; and end rings formed at both end faces of the rotor core and connected with the slotted conductor. The slots and the end rings are filled with molten aluminum at a flow rate of 1.5 m/sec. or below, and then the aluminum is solidified under a high pressure of 400 $kg/cm^2$ or above to render the density of the aluminum thus filled and solidified to be in a range of from 2.64 to 2.70 $kg/cm^3$. The present invention also provides a method for manufacturing such a rotor.

According to the present invention, there can be effectively obtained a squirrel-cage type rotor which is substantially free from the shrinkage holes in the interior of the rotor conductor and which has improved torque charcteristics, quality, and operational reliability, thereby being able to realize reduction in size and weight of the motor as a whole.

BRIEF DESCRIPTION OF THE DRAWINGS

FIG. 1 shows a general squirrel-cage type rotor before it is subjected to casting, in which

FIG. 3 illustrates a conventional squirrel-cage type rotor, in which

FIG. 5 shows the squirrel-cage type rotor according to one embodiment of the present invention, in which

BEST MODE FOR CARRYING OUT THE INVENTION

Figure 8:
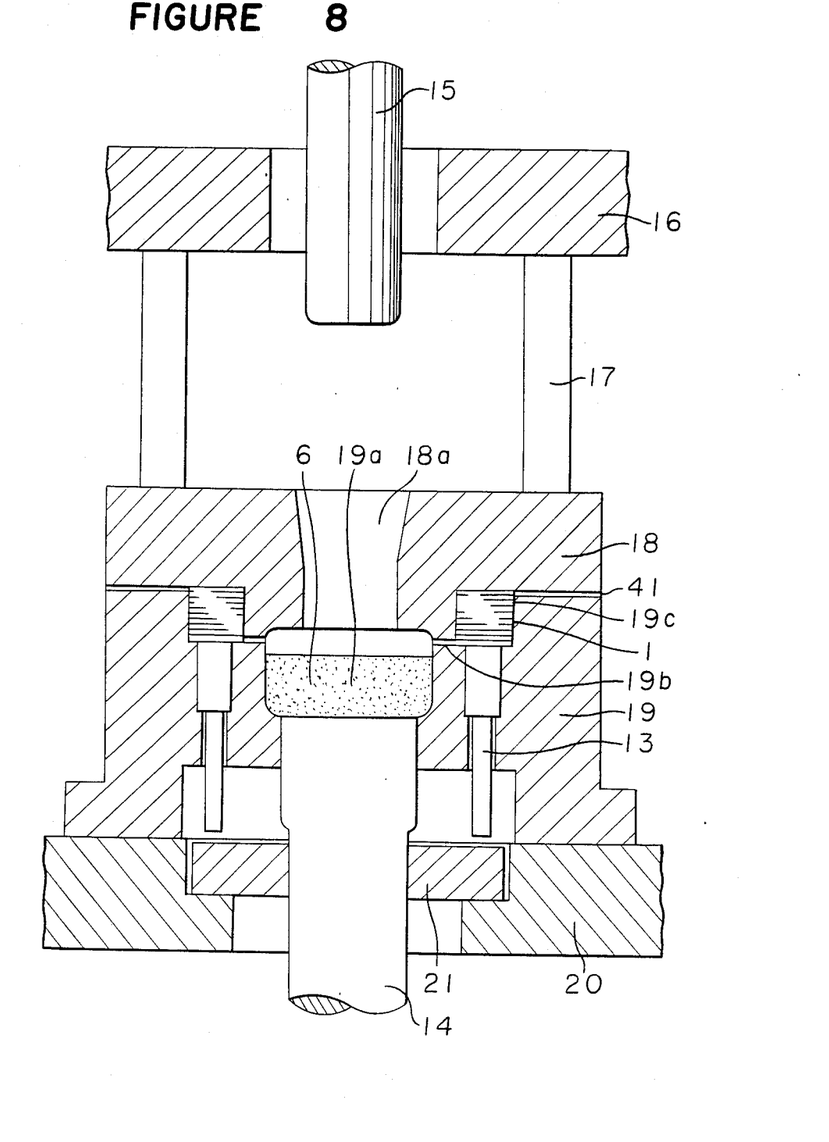
FIGS. 8 and 9 are cross-sectional views showing the casting apparatus for the rotor conductor according to the present invention.

FIG. 8 is a cross-sectional view showing one embodiment of the casting apparatus of the squirrel-cage type rotor according to this invention. In the drawing, a reference numeral 13 designates the extruding rod, and a numeral 14 refers to a knock-out punch which is associated with the extruding rods 13 to cause them to ascend. A numeral 15 refers to a punch; a reference numeral 16 designates a bolster for a pressure applying mechanism such as a press machine, etc. which exerts mold closing force; a reference numeral 17 denotes supporting pillars; a numeral 18 represents an upper mold which is connected with the bolster 16 by means of the supporting pillars 17; a reference numeral 19 designates a lower mold provided with a pouring basin 19a, which stores therein the molten aluminum 6, and which has the extruding rods 13.

The upper mold 18 and the lower mold 19 together constitute a cavity 19c to permit the rotor core 1 to be fitted therein, and a gate 19b to introduce the molten aluminum into the cavity 19c.

A reference numeral 20 designates a table for the bolster 16, and a numeral 21 refers to a lower plate for the knock-out operation, which is fastened by screws to the knock-out punch 14. A numeral 41 refers to a gas outlet port formed at a position on the top end of the cavity 19c and opposite to the gate 19b.

Figure 9:
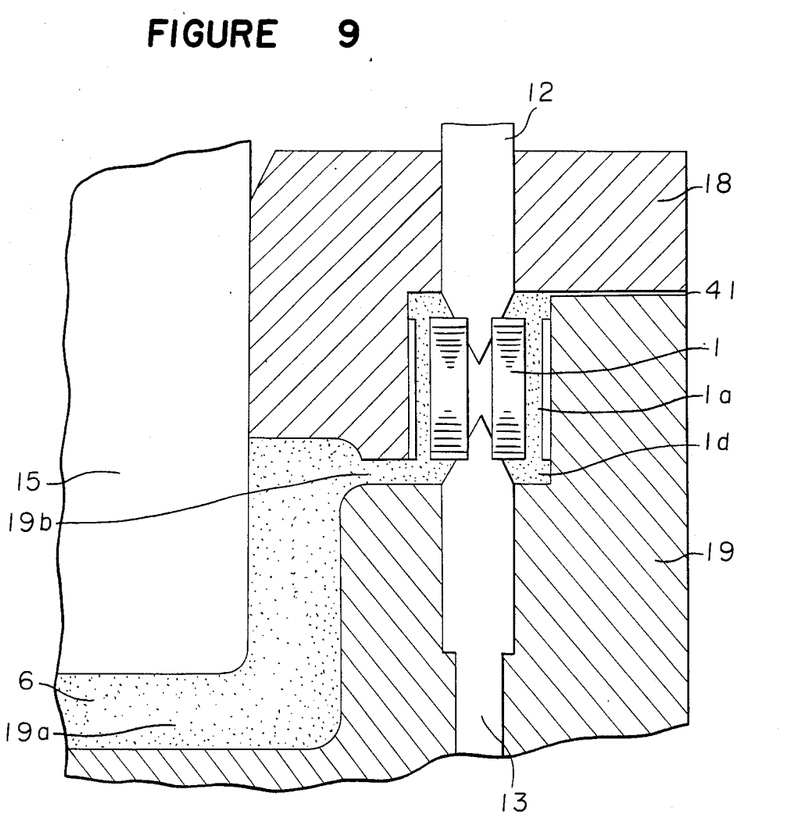

Incidentally, FIG. 9 is an enlarged cross-sectional view showing a state in which the punch 15 in FIG. 8 has come down to thrust into the pouring basin 19a of the lower mold 19 for filling the molten material into the cavity under pressure.

To begin with, several tens of sheets of the thin iron plates 1c, each having a plate thickness of about 0.5 mm and having a multitude of slots 1a perforated at an equal space interval between them in the circumferential direction thereof as well as the rotational shaft inserting bore 1b perforated at the center thereof, are laminated in such a manner that each slot therein may be aligned in the direction of the lamination, thereby constructing the rotor core.

In the next place, the upper mold 18 and the lower mold 19 are preheated to a temperature of about 250° C., and then the squirrel-cage type rotor core 1 having the above-mentioned multitude of slots is fitted into the cavity 19c of the lower mold 19 in such a manner that the slots 1a may be in the direction of the gravity, after which the bolster 16 is lowered down to press the upper mold 18 connected with the supporting pillars 17 to the lower mold to carry out closing of the mold.

Thereafter, molten aluminum 6 is poured from a feeding port 18a in the upper mold 18 into the pouring basin 19a in the lower mold 19 in such a manner that the liquid surface thereof may be at a level lower than the gate 19b, immediately followed by depression of the upper punch 15 to extrude the molten aluminum 6, which has been held in the pouring basin 19a, and to pour it into the slots 1a and the end rings of the rotor core 1 placed in the cavity 19c at a flow rate as low as 1.5 m/sec or below.

The flow rate of the molten aluminum is controlled by regulating the speed of the upper punch 15 (for example, at a rate of from 60 to 80 mm/sec.). By the way, the gate 19b should also preferably have a large breadth, hence a large cross-sectional area.

The molten aluminum 6 is gradually filled upward through the slots 1a starting from the level of the gate 19b, to the level of the top end ring, and reaches to the gas outlet port 41. After the molten aluminum has been filled up, the material in its molten or semi-molten state is solidified by application thereto of a pressure as high as about 400 kg/cm$^2$. Thereafter, the upper mold 18 and the lower mold 19 are opened apart, and the rotor core 1 is pushed out with the extruding rod 13.

Figure 5A:
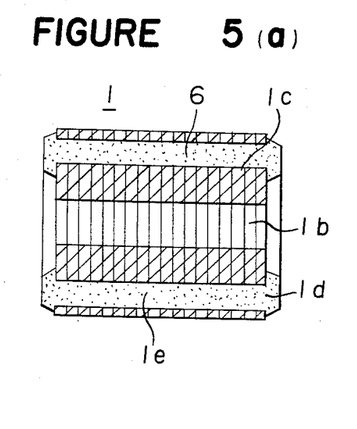
FIG. 5(a) is a cross-sectional view.
Figure 5B:
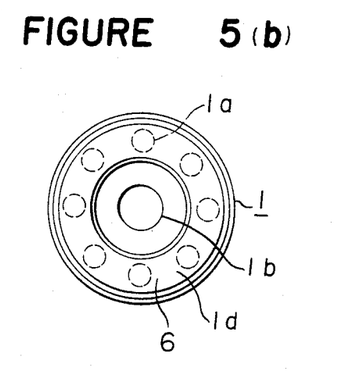
FIG. 5(b) is a side view.

FIGS. 5(a) and 5(b) illustrate the squirrel-cage type rotor according to one embodiment of the present invention, which has been obtained in the above-mentioned manner, in which FIG. 5(a) is a cross-sectional view and FIG. 5(b) is a side view.

Figure 6:
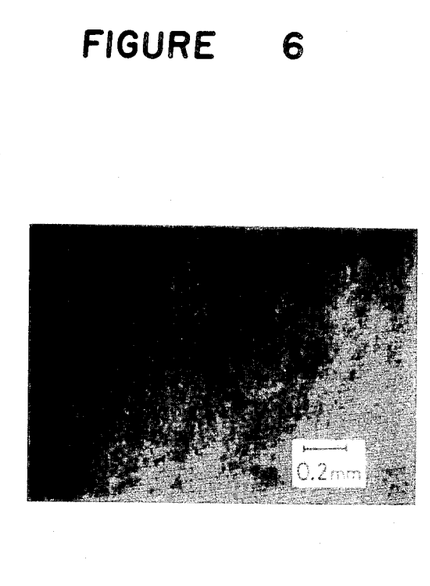
FIG. 6 a micrograph showing the metallographic structure of aluminum constituting the rotor conductor of the squirrel-cage type rotor according to one embodiment of the present invention.

FIG. 6 is a micrograph showing the metallographic structure of aluminum consituting the rotor conductor of this squirrel-cage type rotor. As seen from this micrograph, no substantial formation of blowholes is observed. This aluminum has its density of 2.67 g/cm$^3$, which is higher than the conventional one.

Figure 7:
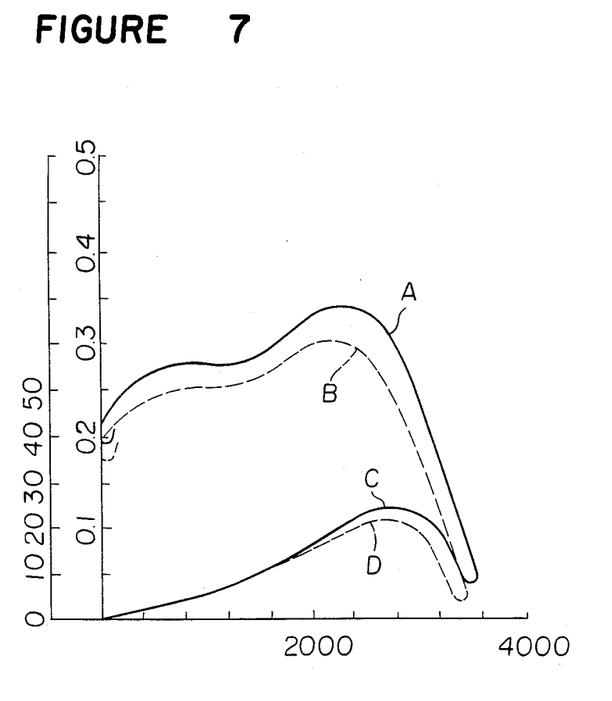
FIG. 7 is a characteristic diagram showing the torque characteristic and operational efficiency of the squirrel-cage type rotor according to one embodiment of the present invention in comparison with those of the conventional rotor.

FIG. 7 is a characteristic diagram showing the torque characteristic and operational efficiency of the squirrel-cage type rotor according to one embodiment of the present invention having the aluminum density of 2.67 g/cm$^3$ in comparison with those of the conventional squirrel-cage type rotor having the aluminum density of 2.57 g/cm$^3$.

In the graphical representation, the ordinate represents both torque (kg.cm) and operational efficiency (%), while the abscissa denotes the number of revolution (rpm) of the rotor. The curve (A) indicates a torque characteristic of the squirrel-cage type rotor according to one embodiment of the present invention; the curve (B) indicates a torque characteristic of the conventional squirrel-cage type rotor; the curve (C) indicates an operational efficiency of the rotor according to the present invention; and the curve (D) indicates an operational efficiency of the conventional rotor. As is apparent from the drawing, the rotor of the present invention having a high aluminum density contributes to improvement in the torque characteristic and operational efficiency of the motor. Maximum 15% of increase in its operational efficiency could be achieved.

According to this embodiment, the characteristic performance of the motor could be improved in comparison with the motor manufactured by the conventional method, as shown in FIG. 7, by eliminating the shrinkage holes in the rotor conductor to attempt increase in its density.

For this purpose, the limit design of the rotor was done for the full display of the material characteristic of the rotor conductor, which not only contributes to reduction in size and weight of the motor and makes it possible to add more value to the product, but also contributes to saving of the material used and therefore makes it possible to reduce the production cost. Further, there is no decrease in the mechanical strength of the rotor due to the shrinkage holes, hence no apprehension to the risk of wire-breakage and damage during high speed rotation of the motor.

Incidentally, the reason for the aluminum being able to be rendered to have high density as such is that the molten aluminum is filled into a space constituting the slots and the end rings at its flow rate as low as 1.5 m/sec. or below. On account of this, the molten aluminum does not form a turbulent flow, but forms a laminar flow with the least enfolding of air (gas) into it, and that, after the filling, the molten aluminum is solidified under a high pressure applied thereto, whereby the occurrence of the blowholes can be prevented and the aluminum as filled can be made more dense.

Figure 10:
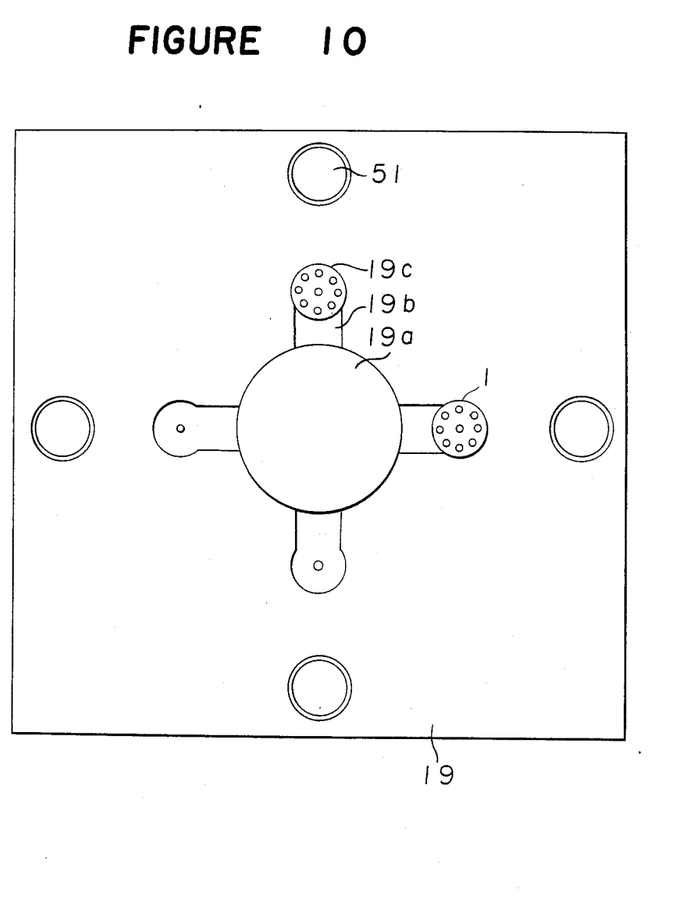
FIG. 10 is a top plan view showing another embodiment of the casting apparatus (lower mold) for the rotor conductor according to the present invention.

FIG. 10 illustrates another embodiment of the casting apparatus according to the present invention, which is a top plan view of the lower mold 19 in a state of the upper mold 18 having been removed. In the Figure, a reference numeral 19 denotes the lower metal mold; a numeral 51 refers to holes formed in the lower mold 19 into which the squirrel-cage type rotor core is inserted for preheating; a reference numeral 19c designates cavities formed in the lower mold 19 into which the squirrel-cage type rotor core for casting is inserted; a reference numeral 19a represents a pouring basin formed in the lower mold 19 in which the metal material for casting is stored; a reference numeral 19b represents the gates, each communicating one of the cavities 19c with the pouring basin 19a; and a reference numeral 1 indicates the squirrel-cage type rotor cores.

In general, the metal mold for casting the squirrel-cage type rotor core is preheated by a burner to a temperature of from 200° to 300° C. before commencing the casting operations, the temperature going up as high as from 300° to 400° C. at the time of casting. As the consequence of this, when the rotor core 1 is placed in the hole 51, it is warmed by heat of the lower mold 19 to be preheated, hence no separate heat source is required for the purpose. Each of the holes 51 is positioned at a predetermined distance between them on the line connecting the centers of the cavity 19c and the pouring basin 19a.

After a preceding rotor core 1 for casting as preheated is placed in the cavity 19c, a subsequent rotor core 1 to be subjected to casting is placed in the second hole 51. Then, the upper mold (not shown in the drawing) and the lower mold 19 are closed, followed by filling the molten metal for casting into the cavity 19c, after which it is cooled to solidify, thereby producing the squirrel-cage type rotor.

During the subsequent casting, the rotor core 1 which has been placed in the hole 51 is preheated to a substantially same temperature as that of the metal mold. When the casting is done with use of this preheated core 1, the molten metal can be filled smoothly without occurrence of the shrinkage holes in the slotted conductor. The reason for this is that, since the rotor core placed in the cavity 19c has been preheated in advance, the filling property of the molten metal is improved, and that a desirable temperature gradient is obtained for the directional solidification of the molten metal by the cooled rotor core which has been placed in the second hole 51.

INDUSTRIAL APPLICABILITY

This present invention is applicable to the squirrel-cage type rotor, and the method for its manufacture.

We claim:
1. A squirrel-cage type rotor comprising:
   (a) a plurality of circular steel plates, each one of said plurality of circular steel plates having a plurality of slots and a central bore formed therethrough, each one of said plurality of slots in each one of said plurality of circular steel plates being aligned with a corresponding slot in every other one of said plurality of steel plates to form an axial slot, and said central bore in each one of said plurality of steel plates being aligned with said central bore in every other one of said plurality of steel plates to form an axial bore, and
   (b) a plurality of aluminum conductors, each one of said plurality of aluminum conductors being disposed in a corresponding one of said axial slots,
   (c) wherein the density of said plurality of aluminum conductors is approximately 2.64 g/cm$^3$.

2. A squirrel-cage type rotor as recited in claim 1 wherein the density of said plurality of aluminum conductors is in the range of 2.64 g/cm$^3$ to 2.70 g/cm$^3$.

3. A squirrel-cage type rotor as recited in claim 1 and further comprising an end ring formed integrally with said plurality of aluminum conductors.

4. A squirrel-cage type rotor as recited in claim 1 and further comprising two end rings, one formed integrally with said plurality of aluminum conductors at each axial end of said plurality of circular steel plates.

* * * * *